Jan. 31, 1961   M. C. UHRAIN   2,970,206
METAL JOINER, PARTICULARLY FOR STRIP
Filed April 2, 1959   3 Sheets-Sheet 1
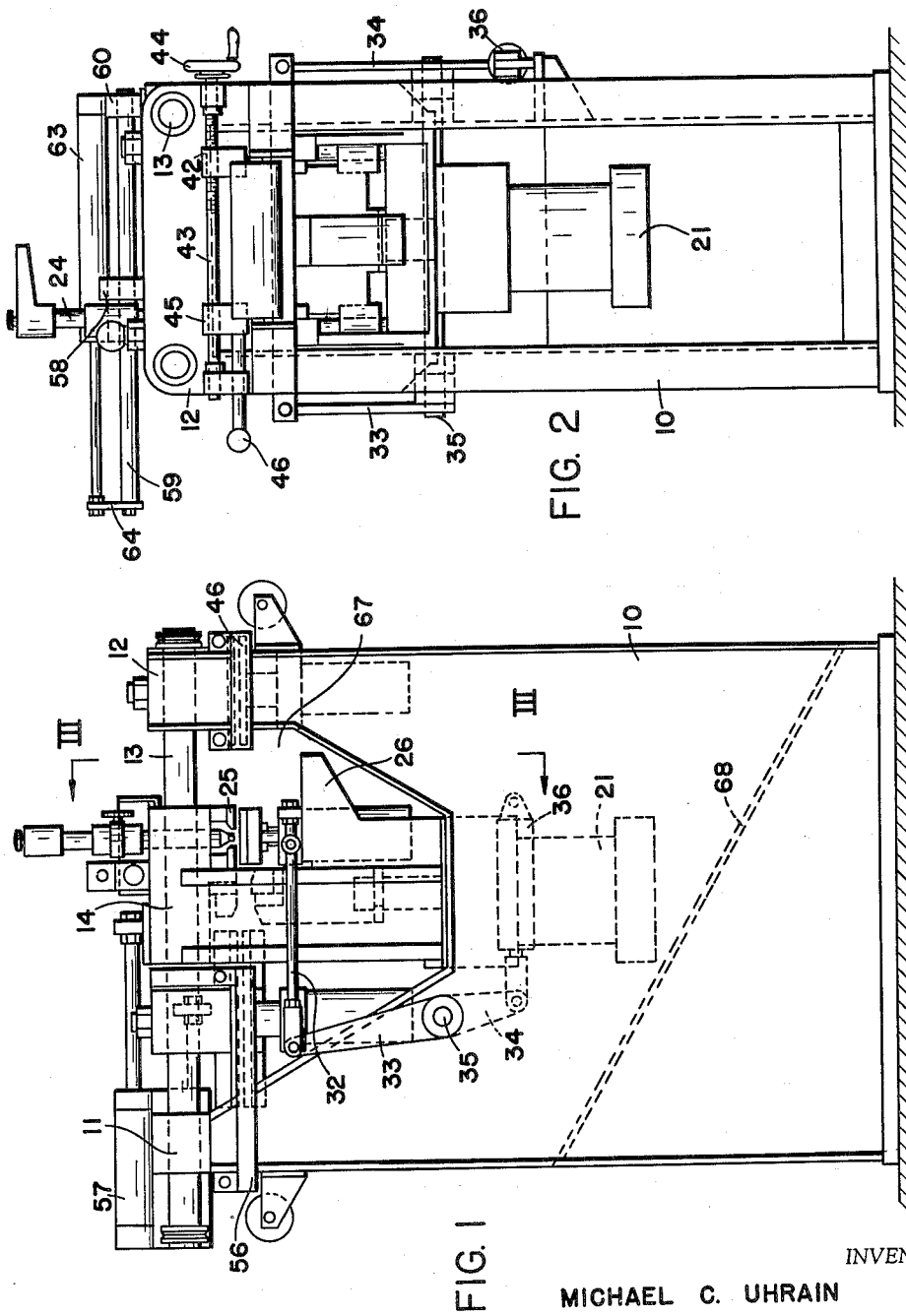
INVENTOR
MICHAEL C. UHRAIN
BY
ATTORNEY

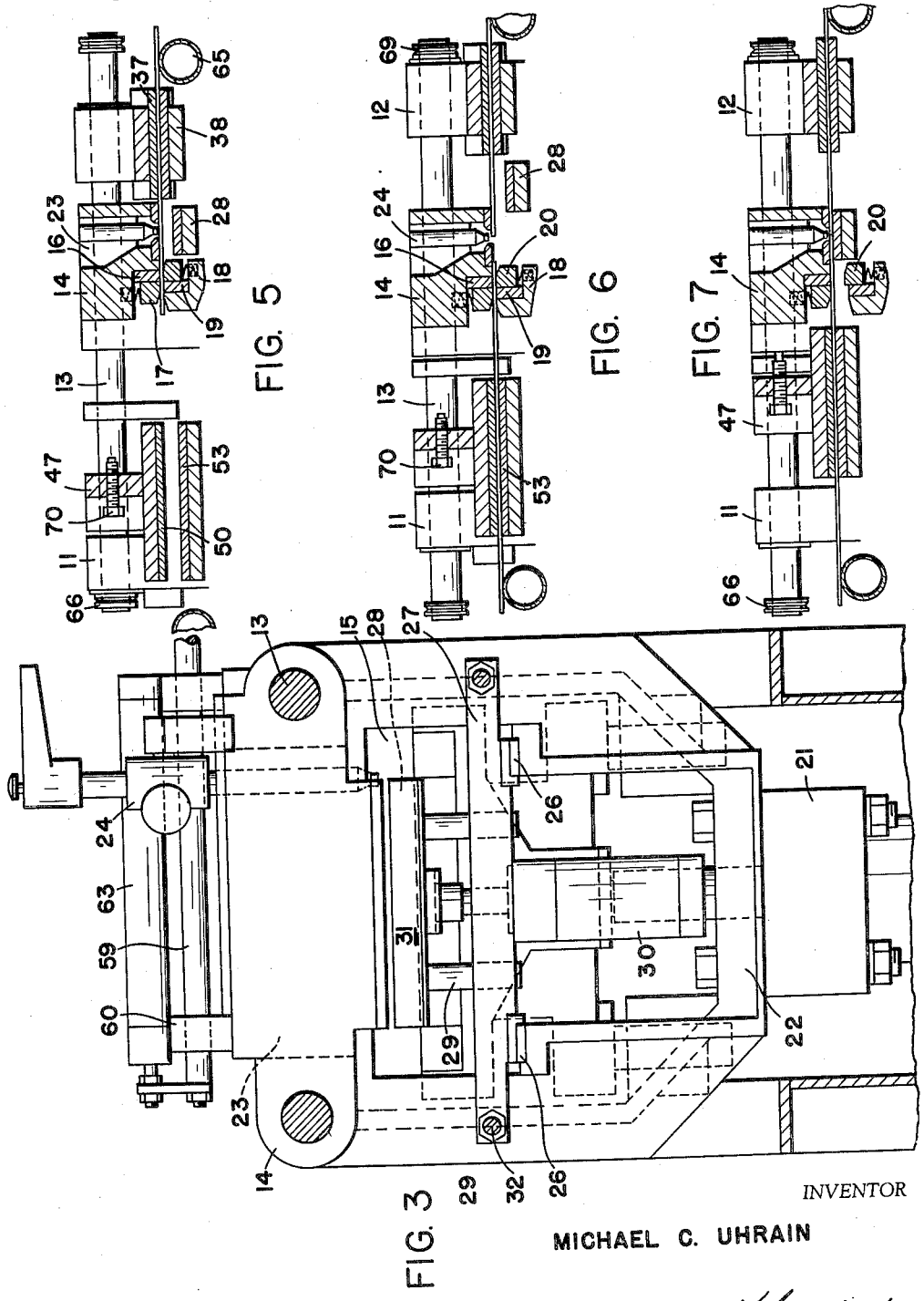

Jan. 31, 1961 M. C. UHRAIN 2,970,206
METAL JOINER, PARTICULARLY FOR STRIP
Filed April 2, 1959 3 Sheets-Sheet 3

INVENTOR
MICHAEL C. UHRAIN

BY Francis J. Klempay
ATTORNEY

United States Patent Office 2,970,206
Patented Jan. 31, 1961

2,970,206

METAL JOINER, PARTICULARLY FOR STRIP

Michael C. Uhrain, Youngstown, Ohio, assignor, by mesne assignments, to The Taylor-Winfield Corporation, Warren, Ohio, a corporation of Ohio Filed Apr. 2, 1959, Ser. No. 803,721

8 Claims. (Cl. 219—125)

This invention relates to apparatus for joining metal articles in end-to-end relation and more particularly for joining metal strip. It has heretofore been proposed in apparatus for this purpose to incorporate in a unitary assembly means to accurately shear the tail end of a leading piece of strip and the head end of the trailing or next succeeding piece of strip and means to weld these ends together, after abutting or closely juxtapositioning the same. The welding means commonly employed comprises an arc welding head embodying an electrode and passage means to supply an inert gas, such as argon, to the point of weld, and such heads may or may not be supplied with a consumable electrode and automatic means to control the length of arc, depending on the analysis and gauge of the strip being joined. Of course, in such apparatus suitable means is provided to track the welding head accurately along the line of weld at the desired proper speed.

It is particularly important in apparatus of the kind outlined above that the shearing be precise and uniform, and that the sheared ends of the pieces to be joined be brought into parallel and minutely spaced relation with precision and that in the case of thin strip, particularly, the adjacent strip portions of the two pieces lie precisely in the same plane. Further, the apparatus must be rugged and durable for mill service and must also be capable of automatic sequential operation so that the time required to make the joints is kept to a minimum.

The primary object of the present invention is to provide apparatus for the purpose stated and satisfying the requirements outlined above which is of an improved arrangement and design, easier to align and adjust, of substantially less parts, and much more economical to produce and operate than any apparatus heretofore proposed for similar purposes. These improvements are accomplished in the present invention primarily by so designing and arranging the principle structural parts of the apparatus—those required to guide and operate the shearing and welding devices—in an exceedingly compact manner wherein inaccuracies are less prevalent and wherein the shearing and clamping forces are contained within a small area. By making the apparatus very compact it is possible to greatly simplify the parts, reduce deflection, and simplify the precise adjustments required in apparatus of this nature. These attributes which flow from the novel design and arrangement of the necessary parts, and their improved inter-relation, are particularly advantageous in machines for joining wide strip which in the prior art has required very complex, heavy, and large apparatus.

The precision required in shearing and juxtapositioning the ends of the strip prior to welding necessarily requires that the end portions of the strip lengths to be joined be firmly held and aligned between the shearing and welding steps and heretofore this has required heavy, complex apparatus to positionally interchange the shearing and welding apparatus at the joining line. In some machines the problem has been met by shuttling a unitary ring-shaped carrier transversely of the strip, the carrier mounting the shearing unit and a welding assembly in side-by-side relation. For wide strip this carrier assumes very large proportions and, therefore necessitates a long, heavy base extending transversely of the strip length. It has also been proposed to shuttle a combined shearing and welding unit longitudinally of the strip but in all such prior devices the arrangement has been such that in the welding position a long length of unsupported and unclamped section of strip extends between the line of weld and the clamp so that in this method it is impossible to maintain the necessary precise gap between the strip ends to be welded. It is accordingly the primary object of the invention to provide an improved arrangement, in apparatus of the kind involved, for interpositioning the shear and welding unit as required while eliminating the necessity for large, cumbersome carriers for these units and while yet allowing the strip supporting and aligning clamps to be positioned close to the welding unit when preparing to weld.

The above and other objections and advantages of the invention will become apparent upon consideration of the following specification and the accompanying drawings wherein there is disclosed a preferred embodiment of the invention.

In the drawing:

Figures 1 and 2 are side and end elevations, respectively, of a combined shear and welder for joining metal strip and the like and constructed in accordance with the principles of the invention;

Figure 3 is a transverse sectional view taken along the line III—III of Figure 1;

Figure 4:
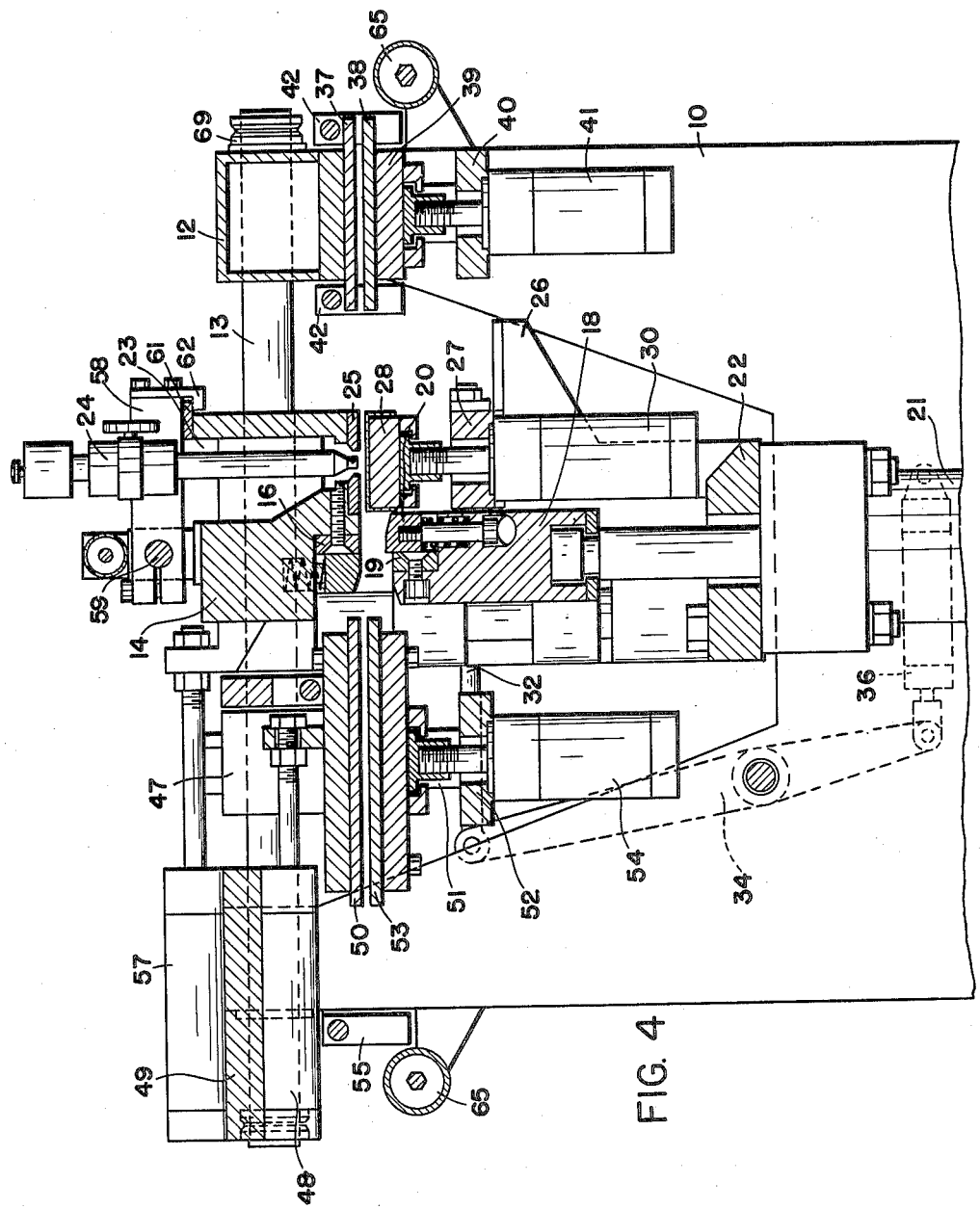

Figure 4 is a longitudinal vertical section of the apparatus of Figures 1 and 2; and Figure 5, 6, and 7 are views showing the sequence of operations of the essential parts of the apparatus of Figures 1 and 2.

In the drawing, reference numeral 10 designates a hollow base which is preferably a steel weldment and which at its upper end includes blocks 11 and 12 spaced longitudinally along the line of strip travelling through the machine. These blocks are bored and bushed to slidably receive transversely spaced rods 13 which are precisely parallel to each other and parallel to said line of strip travel.

Rigidly secured to the rods 13 intermediate the bearing blocks 11 and 12 and suspended therefrom in depending relation is a transversely extending main frame 14 having an enlarged window 15 extending longitudinally therethrough. This frame 14 is preferably a steel casting and is provided with a machined recess for receiving an upper shear blade 16 (Figures 4 thru 7). Associated with the blade 16 is a spring-pressed hold-down stripper bar 17. Suitably guided in vertical ways machined in the frame 14 is a lower shear blade holder 18 mounting a lower shear blade 19 and an associated stripper bar 20. Holder 18 is connected to the rod of a vertically disposed hydraulic fluid cylinder 21 mounted in depending relation on an integral horizontal strut 22 of the frame 14. As shown, cylinder 21 is fairly large and of a heavy-duty type so that during its upward stroke it can deliver sufficient force to operate the shear.

The upper horizontal or main strut of the frame 14 is provided with a vertical window 23 to receive the barrel of an arc welding head designed generally by reference numeral 24. As indicated in Figure 3, the window 23 is elongated sufficiently in a direction transverse of the strip to enable the entire width of the strip to be welded in a single pass. As shown more clearly in Figure 4 the bottom surface of the upper or main strut of the frame 14 is suitably machined adjacent the bottom end of the window 23 to receive a pair of toe-clamp plates 25 which extend inwardly toward each other close to the path of travel of the bottom or arc-emitting end of the welding head 24.

Slidably mounted for movement longitudinally of the machine and strip on ways 26 formed integrally with the frame 14 is the welding clamp carrier 27. As shown more clearly in Figures 3 and 4 the welding claim comprises a bar 28 from which depends a pair of spaced guide pins 29 received in bores formed in the carrier 27. A fluid cylinder 30 is carried centrally in depending relation by the carrier 27 and its rod extends upwardly through an aperture therein to be connected to the bar 28 whereby the bar may be raised or lowered. In accordance with usual practice and as required in the arc welding process when joining strip, for example, in end-to-end relation the clamping bar 28 is sheathed with a readily replaceable copper cap 31 and, if desired, this sheath may be provided with an underlying strip of compressible material, not shown.

For a purpose to be later explained, the weld clamp must be shuttled on the ways 26 in the sequence of operation of the parts during the complete shearing and welding cycle and to accomplish this I provide a pair of longitudinally extending rods 32 connected to the outwardly extending opposite ends of the clamp carrier 27 as shown in Figures 1 and 3. Rods 32 are, in turn, pivotally connected to the outer free ends of a pair of crank arms 33 and 34 which are rigidly mounted on opposite ends of a rock shaft 35 extending transversely through the base 10. As shown in Figures 1 and 2 the arm 34 extends past the shaft 35 for engagement with the rod of a double-acting fluid cylinder 36 which is likewise mounted on the base 10. It should be apparent that upon actuation of cylinder 36 the weld clamp will be moved longitudinally along the ways 26 in either desired direction.

Positioned immediately below the bearing block 12 is a strip clamp comprising a fixed upper plate 37 and a movable lower plate 38 which is carried on a bar 39. Bar 39 is guided for vertical movement by means of a pair of spaced depending pins, not shown, which enter bores, also not shown, in a fixed transverse bar 40 of the base 10, all in the manner described above in connection with the weld clamp. Bar 39 is moved vertically into and out of clamping position by a fluid cylinder 41 carried by fixed bar 40 and having its rod extending upwardly through an aperture in bar 40 for connection with the movable bar 39. For aligning and centering the strip in the clamp 37, 38 I provide a pair of longitudinally spaced back-stops 42 each threadably mounted on a screw 43. These screws are coupled together by means, not shown, and are arranged to be rotated by a hand wheel 44 (Figure 2), and it should be observed that the stops 42 will move in unison and when properly adjusted in assembly will present a longitudinally extending guide line for the rear edge of the strip which is parallel with the longitudinal axis of the machine. To force the strip over into engagement with both of the back stops 42 prior to clamping I provide a pair of blocks 45 which are slidably received on unthreaded portions of the screws 43 and which are arranged to be moved therealong by a U-shaped handle 46 suitably guided as shown in Figures 1 and 2, and having its hand-grip portion in exposed position on the side of the machine.

In normal operation the strip moves from left to right of the apparatus as viewed in Figures 1 and 4, and the strip clamp above described is normally used for the purpose of rigidly holding the tail-end portion of a strip length which has already moved through the apparatus, such tail-end portion being shown in Figure 5 where the shear is in proper position to crop the tail-end extremity thereof. For clamping and guiding the leading-end portion of the next succeeding length of strip I provide a slidable clamp which is carried by a member 47 slidably received on the rods 13 and adapted to be moved therealong by a double-acting fluid cylinder 48 (Figure 4) carried by a transverse member 49 of the base 10. Member 47 carries an upper clamp plate 50 and has a pair of laterally spaced legs 51 which support a transverse bar 52. The vertically movable clamp plate 53 is guided by depending pins, not shown, which enter apertures in the bar 52 and is arranged to be raised and lowered by a fluid cylinder 54, all in the manner described in connection with the weld clamp. For aligning and centering the strip in the clamp 50, 53 I provide adjustable back stops 55 and movable front bumper blocks, not shown, operated by the U-shaped handle 56 (Figure 1) having an exposed hand-grip portion, all in the manner of the centering and aligning assembly provided for the fixed strip clamp 37, 38.

The main frame 14 is shuttled from one to the other of its two operating positions by a cylinder 57 mounted on the structural member 49 and having its rod connected to the frame 14 as shown in Figure 4. The welding head 24 is carried by a member 58 which at one end is clamped to a transversely extending rod 59 suitably guided in widely spaced blocks 60 carried on the frame 14. The opposite end of carrier 58 moves on a way 61 mounted on the frame 14 (Figure 4) and member 61 has a projecting lip engaged by a hook 62 which functions to prevent any upward movement of the carrier 58 and welding head 24. It is important, of course, that during travel of the welding head across the strip and particularly in simpler machines where the electrode is not automatically fed, that the lower tip of the welding head maintains a uniform spacing above the top surfaces of the strip. This is easily accomplished in the present machine by making the bottom surface of a toe clamp 25 exactly parallel with the top surface of the way member 61 and parallel with the common axis of the guide bushings in blocks 60. Parallel with the rod 59 and mounted on the blocks 60 is a small hydraulic fluid cylinder 63, the piston rod of which is connected to one end of the rod 59 as at 64. In welding strip the welding head 24 moves from the right position as shown in Figure 3 to a left position as shown in Figure 2 and during this traverse hydraulic fluid is supplied to the cylinder 63 by a speed-control valve, not shown, supplied by a source of constant pressure, also not shown.

The operation of the apparatus described above can be readily understood by comparing Figures 5, 6, and 7. With all the clamps open strip may be payed through the machine while being supported at either end of the machine by a roll 65. It will be understood that this strip may be supplied to a processing line or, in many cases, fed to a looper or strip storage device which in turn feeds a tube mill, for example. At the start of a shearing and welding cycle the frame 14 is positioned adjacent the fixed clamp 37, 38 and the exact position is very accurately predetermined by adjustment of finely threaded nuts 66 on the left ends of rods 13 which engage the blocks 11. As the trailing end of the moving strip approaches the line of shear as can be readily observed through the cut away portion 67 of the base 10, the strip is stopped and after the same is aligned and centered by forceably moving inward the handle 46 the cylinder 41 is energized to close the clamp 37, 38. The shear is now actuated and the cropping falls down past cylinder 21 and into the bottom of base 10 which may have an inclined bottom wall as shown at 68.

With the above strip rigidly retained in the clamp 37, 38 the cylinder 57 is energized and the frame 14 moved a precise distance to the left as determined by the setting of finely threaded nuts 69 on the right end of rods 13 which engage the fixed block 12. The extent of movement of the frame is precisely controlled so that the center of the tungsten or filler wire electrode moves to a line which is spaced to the left of the shearing edge of the strip a distance equal to one half of the final spacing or gap required between the edges to be welded together. The gap required is, of course, determined by the particular analysis and gauge of strip being handled. It should now be observed that the path of travel of the welding head 24 must be precisely parallel with the shearing edge of the strip so that the path of travel of the center of the lower end of the tungsten, or filler wire, electrode will move correctly along the center line of the gap between the two edges to be welded together. This is readily accomplished in my invention by aligning the bores in the block 60 very accurately in parallelism with the cutting edge of the shear blade 16. It should be observed that while the frame 14 is moved to the left after shearing the first piece of strip the carrier for the weld clamp 28 remains immovable due to non-actuation of the cylinder 36. The moving ways 26 supports the carrier 27 during this interval.

With the frame 14 shuttled to the left as explained above and the shear and clamp 53 open the leading end of the second piece of strip may be threaded into the machine until the leading edge passes the shear slightly, and after this second piece of strip is aligned and centered by inward thrust of the handle 56 the cylinder 54 is energized to close the clamp 50, 53. It should be observed that at this sequence of the cycle the movable clamp 50, 53 is in its left position and this position may be accurately predetermined and controlled either by bottoming the pull back cylinder 48 or by allowing the blocks 47 to abut against fixed blocks 11. With the second strip piece thus rigidly clamped the shear cylinder 21 is now again energized and the resultant cropping falls down between the lower shear blade carrier 18 and the retracted weld clamp assembly. The ways 26 which support the weld clamp assembly are widely spaced, as shown in Figure 3, to permit downward passage of the cropping for any strip width within the capacity of the machine.

After shearing the second strip piece and subsequent immediate opening of the shear, cylinder 36 is actuated to slide the weld clamp into operative position below the fixed toe clamp members 25. Simultaneously the cylinder 48 is energized in a direction to move the clamp 50, 53 with the strip rigidly held therebetween to the right a precisely controlled distance determined by the setting of the screws 70 which are screw-received in ears 71 formed integrally with the blocks 47 and which engage machined surfaces on the frame 14. This extent of movement of the clamp 50, 53 is precisely always sufficient to bring the sheared leading edge of the second strip piece to a position spaced from the sheared trailing edge of the first piece to give the required and/or desired gap between the pieces. At this time the weld clamp cylinder 30 is energized to clamp the strip ends between the toe clamp members 25 and the copper sheath on bar 28 and immediately thereafter welding current is supplied to the weld 24. Further means, not shown, but well understood in the art, is operative after striking and stabilization of the arc to admit fluid to the weld traverse cylinder 63 under metered conditions, as explained above, and the welding proceeds across the width of the strip. It will be understood that the initial starting position of the welding head will be adjusted as close to the back edge of the strip as possible for the particular material being welded. Upon completion of the welding the flow of weld current is interrupted, all the clamps are opened, the frame 14 moved to its right position while the sliding clamp 50, 53 is moved to its left position, all in preparation for the next succeeding cycle of operation.

It will be understood that in actual practice the various cylinders employed in the assembly may be valved under automatic sequence control, not shown, so that after the operator has located, clamped and sheared the second piece of strip under manual control the balance of the sequence of operations required in the complete cycle will follow automatically and rapidly.

It should now be apparent that I have provided improved apparatus for joining metal strip and the like and operative to shear and weld the work in sequence which accomplishes the objects initially set out. An important feature of the invention is the nature of mounting of the main frame 14 which, as will be obvious from a study of Figure 3, is highly efficient in containing the forces necessitated by the shearing action. By rigidly securing this frame to the rods 13 a rigid and highly accurate guiding is effected whereby the two lines of shear effected in each cycle are always precisely parallel. The construction of the shear, further, provides a very simple yet most convenient arrangement for accurately gauging the movement of the shuttle (Frame 14) relative to the fixed strip clamp and the movement of the slidable clamp relative to the shuttle as required in the apparatus. As explained above, the required precise parallelism between the line of shear and the path of the movement of the welding head is easily and automatically obtained and, further, the apparatus permits the line of weld to be close to the shear. This latter feature is advantageous as evidenced from Figure 7, since it permits close spacing of the adjacent ends of the two strip clamps with respect to the weld clamps so that the effect of buckling and other possible deformities in the flatness of the strip on the welding gap is minimized. This is very important when welding strip of thin gauge.

While I have illustrated a small machine—having a capacity of strip up to 9" in width and up to 1/4" thickness in mild steel, it should be observed that the organization and structure of the machine enables yet greater advantages to be obtained when constructed for wide strip. In such cases it is only necessary to enlarge and strengthen the transverse vertical projection of the assembly including the frame 14 and other elements dealing with the transverse dimensions of the strip. Any required change in the longitudinal vertical projection will be in the vertical direction so that minimum longitudinal movement of the shuttle 14 and the sliding strip clamp will remain unchanged and so that, again, there will be a minimum of unsupported length in the projections of the strip pieces toward each other preparatory to actuation of the weld clamp.

The above specifically described embodiment of the invention should be considered as illustrative only since obviously many changes may be made therein without departing from the spirit or scope of the invention. Reference therefore should be had to the appended claims in determining the scope of the invention.

I claim:

1. In apparatus for joining strip and the like a base, a fixed strip clamp at one longitudinal end of the said base, a longitudinally slidable strip clamp at the other longitudinal end of said base, said strip clamps being so related as to clamp a pair of strip lengths in a common plane, a combined shear and welding unit slidably mounted for longitudinal movement on said base intermediate said clamps, said unit comprising a transverse fixed upper shear blade having its cutting edge immediately about said plane and closely adjacent parallel welding toe-clamps longitudinally spaced from each other to allow transverse passage of the electrode of an arc welding head, the bottom surfaces of said toe-clamps being substantially in the plane of the bottom edge of said fixed shear blade, said unit also comprising a power-operated vertically movable lower shear blade and a closely adjacent vertically movable weld clamp adapted to underlie said toe-clamps, and means mounting said welding clamp for longitudinal movement with respect to said shear blades and said toe-clamps to provide for downward passage of croppings on the side of the shear adjacent said weld clamp, the parts being so oriented that said weld clamp is longitudinally intermediate the fixed strip clamp and the shear.

2. Apparatus according to claim 1 further characterized in that said unit comprises a vertically positioned but transversely extending open frame having a main top strut, spaced downwardly extending side legs, and a structural member interconnecting the lower ends of said side legs; said fixed shear blade being mounted on said top strut, and means on said top strut to support and guide an arc welding head for precise parallel movement with respect to said fixed shear blade, the arrangement of the parts being such that the path of travel of the arc emitting tip of the electrode of said head is closely adjacent to said fixed shear blade.

3. Apparatus according to claim 2 further including vertical ways on said side legs, a lower shear blade holder vertically guided in said ways, said lower shear blade being mounted on said holder, and power means on said structural member to vertically move said holder.

4. Apparatus according to claim 3 further including a pair of transversely spaced ways extending longitudinally out from said side legs, and said longitudinally movable weld clamp being slidably mounted on said last mentioned ways.

5. Apparatus for joining metal strip and the like in end-to-end relation comprising a base and a transversely spaced pair of longitudinally aligned bushings rigidly mounted on said base at each longitudinal end thereof, a pair of transversely spaced parallel guide rods slidably received in said bushings, a fixed stock clamp mounted on said base adjacent one pair of said bushings, a second stock clamp adjacent said other pair of bushings and mounted for longitudinal sliding movement, a combined shear and welding unit rigidly secured to said guide rods intermediate said clamps and having adjacent transverse shearing and welding assemblies with the welding assembly djacent said fixed clamp, said welding assembly having a vertically movable clamp member, and means mounting said clamp member for longitudinal outward movement with respect to said shearing assembly.

6. Apparatus according to claim 5 further including adjustable stop means on said rods and means to move said unit longitudinally whereby the transverse line of weld may be precisely interchanged with the transverse line of shear and vice versa, and means to gauge the extent of sliding movement of the movable stock clamp whereby while said unit remains in one of its positions a sheared end of stock may be moved to welding position.

7. In apparatus for joining metal strip and the like wherein the adjacent ends of the strip pieces to be joined are first sheared and then the edges are brought together to a controlled gap and arc welded together comprising in combination a fixed clamp for securing the trailing end of a length of strip, a unitary assembly comprising adjacent parallel means to shear and weld the strip trnsversely, means to move said assembly longitudinally away from said fixed clamp and to control the extent of such movement to precisely locate the transverse path of movement of the welder in desired relation to the plane of shear after said trailing end is sheared, a second strip clamp positioned on the opposite side of the shear from said fixed strip clamp to secure the leading end portion of a second length of strip, said second clamp being mounted for longitudinal movement so that after the leading end portion of said second strip length is sheared off the sheared forward edge may be advanced to said transverse path of movement of the welder without further movement of said assembly, and means to controllably limit the advance of said movable strip clamp.

8. Apparatus according to claim 7 further characterized in that said means to weld comprises a weld clamp having a member movable toward and away from the strip when in welding position, and means to move said weld clamp member longitudinally away from the shear to allow downward passage of croppings on the side of said shear towards said weld clamp.

References Cited in the file of this patent
UNITED STATES PATENTS

| | | |
|---|---|---|
| 2,078,365 | Biggert et al. | Apr. 27, 1937 |
| 2,143,969 | Biggert | Jan. 17, 1939 |
| 2,196,941 | Reed et al. | Apr. 9, 1940 |
| 2,730,601 | Reed | Jan. 10, 1956 |
| 2,874,266 | Klempay | Feb. 17, 1959 |